July 18, 1961  G. A. LYON  2,992,708
AIR CIRCULATING WHEEL STRUCTURE
Original Filed Jan. 14, 1954
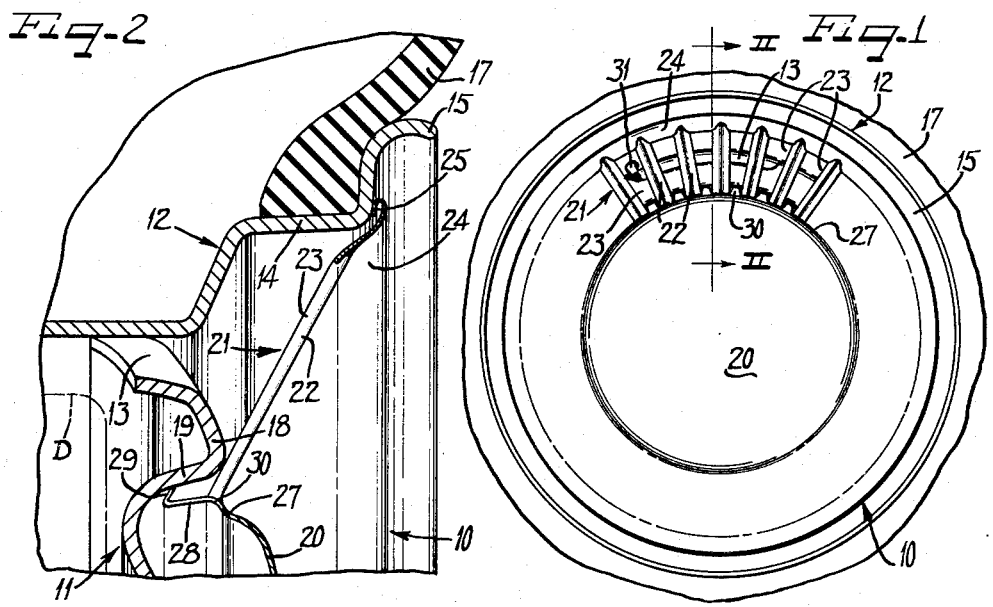
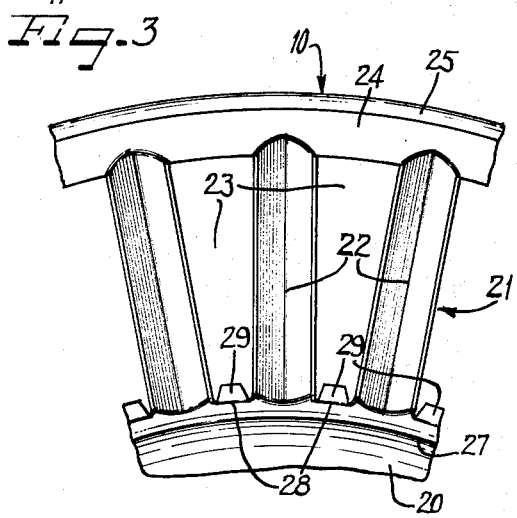
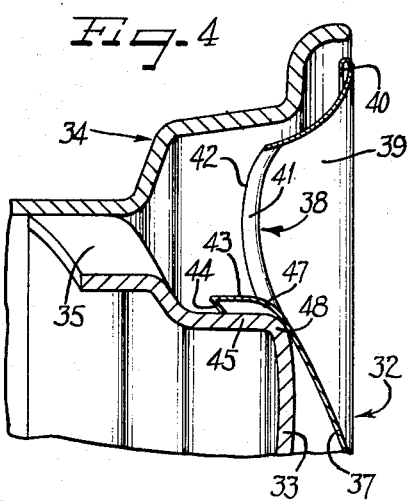
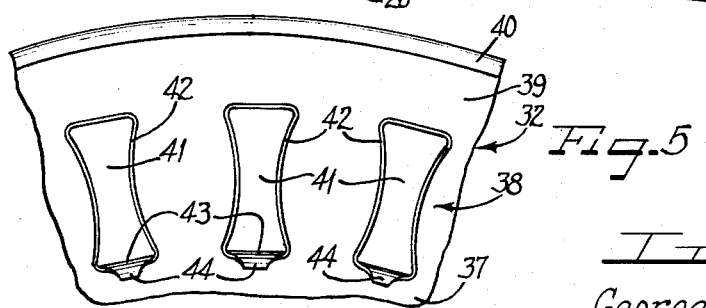
Inventor
George Albert Lyon

United States Patent Office 2,992,708
Patented July 18, 1961

2,992,708
AIR CIRCULATING WHEEL STRUCTURE
George Albert Lyon, 13881 W. Chicago Blvd., Detroit 28, Mich.
Original application Jan. 14, 1954, Ser. No. 404,021, now Patent No. 2,885,038, dated May 5, 1959. Divided and this application July 30, 1958, Ser. No. 752,012
6 Claims. (Cl. 188—264)

The present invention relates to improvements in wheel structures and more particularly concerns such structures providing for circulation of air therethrough for brake drum cooling.

The present application is a division of my application Serial No. 404,021 filed January 14, 1954, now Patent No. 2,885,038.

An object of the present invention is to provide an improved wheel structure having brake drum cooling air circulation openings therethrough and with a cover for the outer side of the wheel retained thereon in a manner which is in keeping with the desirability for effective air circulation through the wheel.

Another object of the invention is to provide an improved wheel structure wherein the wheel and a cover therefor have novel retaining spring fingers means and coactive shoulder means on the wheel enabling efficient press-on, pry-off application and removal of the cover.

A further object of the invention is to provide in a wheel structure a cover arrangement which will substantially entirely cover the outer side of the wheel but is provided with openings through which dirt and gravel entering behind the cover through the wheel openings may escape, as well as to improve the air circulation through the wheel for brake drum cooling.

Still another object of the invention is to provide improved retaining shoulder and retaining finger cooperation between a wheel body and a cover for disposition over the outer side of the wheel.

Other objects, features and advantages of the present invention will be readily apparent from the following detailed description of certain preferred embodiments thereof, taken in connection with the accompanying drawing in which:

FIGURE 1 is a fragmentary side elevational view of a wheel structure embodying features of the invention;

FIGURE 2 is an enlarged fragmentary radial sectional detail view taken substantially on the line II—II of FIGURE 1;

FIGURE 3 is a fragmentary rear view of a portion of the cover of FIGURES 1 and 2;

FIGURE 4 is a fragmentary radial sectional detail view through a wheel and cover assembly, taken substantially in the same plane as FIGURE 2 but showing a modification; and FIGURE 5 is a fragmentary rear elevational view of the cover of FIGURE 4.

Having reference to FIGURES 1, 2 and 3, a wheel cover 10 is constructed and arranged to be applied over the outer side of a vehicle wheel such as an automobile wheel including a wheel body 11 and a drop center, multi-flange tire rim 12 having at juncture of the wheel body and tire rim a plurality such as four wheel openings 13 through which air is adapted to circulate for cooling a brake drum with which the wheel is associated in service in the customary manner and which brake drum is indicated by the broken line D in FIGURE 2. The tire rim 12 includes an intermediate flange 14 and a terminal flange 15 and is adapted to support a pneumatic tire 17.

Herein the wheel body 11 is provided with an annular generally axially outwardly projecting nose bulge 18 having a rather abrupt radially inwardly facing radially inner annular shoulder flange portion 19 of substantial axial width. This radially inwardly facing flange portion provides means for cover retaining engagement with retaining means on the cover 10. To this end, the cover comprises an inner or central crown portion 20 for overlying the central portion of the wheel and joining in generally divergent relation with a generally radially and axially outwardly directed outer annular cover portion 21 divided into a series of generally radially extending spoke ribs 22 and intervening openings 23. At their radially inner ends the spoke ribs 22 join the central cover portion or crown 20 and at their radially outer ends the spoke ribs merge with an annular continuous reinforcing marginal portion 24 of the cover including an underturned terminal 25 which in assembly with the wheel is adapted to overlie the radially inner portion of the terminal flange 15. It will be observed that the openings 23 in the cover lie opposite the wheel openings 13 for air circulation purposes.

Juncture of the crown portion 20 and the outer divergent portion 21 of the cover is on a generally axially inwardly directed annular reinforcing rib 27. Joined to this rib and to the radially inner end portions of the spoke ribs 22 is a series of generally axially inwardly projecting cover retaining resilient fingers 28 derived from material struck from the openings 23 and extending generally as extensions from the adjacent edge of the crown 20 of the cover. Each of the fingers 28 has a short and stiff generally radially and axially outwardly directed cover retaining terminal 29 which normally extends to a slightly greater diameter than the engaged diameter of the wheel body shoulder flange 19. Thereby, upon pressing the cover axially inwardly into position on the wheel, the retaining fingers 28 will be resiliently tensioned as they are flexed radially inwardly as the tips of the retaining terminals 29 cam axially inwardly and radially inwardly along the generally radially inwardly and axially inwardly sloping surface of the flange 19.

It will be observed that at juncture of the retaining fingers 28 with the cover body there is provided in each instance a stiff reinforcing rib juncture 30 so that the fingers are backed up by the rigid juncture to enter into firm resiliently tensioned gripping engagement with the wheel flange 19. In the fully assembled relation of the cover with the outer side of the wheel either the radially inner end portions of the spoke ribs 22 may engage the crown of the nose bulge 18 of the wheel body, or the underturned reinforcing and finishing flange 25 of the radially outer marginal portion 24 of the cover may engage against the tire rim to determine the axially inward disposition of the cover on the wheel.

A valve stem 31 projecting from the tire rim is accessible through one of the openings 23 in the cover.

In order to remove the cover from the wheel, a pry-off tool may be inserted either behind the outer edge 25 of the cover or behind the radially inner portion of one of the rigid reinforced spoke ribs 22 with leverage applied against the crown of the nose bulge 18 of the wheel body.

In the modification of FIGURES 4 and 5, a cover 32 is applied over the outer side of a wheel comprising a wheel body 33 and a tire rim 34, wheel openings 35 being provided at juncture of the wheel body with the tire rim.

The cover 32 comprises a central cover portion or crown 37 joining on a generally convex-concave annular axially inwardly extending rib-like dished portion 38 with a radially outer annular marginal cover portion 39 which terminates in an underturned reinforcing and finishing bead 40 which in assembly is arranged to be disposed in spaced relation to the terminal flange of the tire rim 34.

The intermediate inwardly dished cover portion 38 is arranged to lie in assembly with the wheel opposite the juncture between the wheel body and the tire rim and thus opposite the wheel openings 35. In the present instance, the dished intermediate portion 38 of the cover is provided with a series of annularly disposed and spaced openings 41 which are preferably of a generally quadrangular form defined by continuous generally axially inwardly directed respective reinforcing flanges 42 which at the radially inner and outer ends of the openings extend substantially as continuations of the crown portion 37 and the outer annular portion 39, respectively. It will be observed that the openings 41 are opposite the wheel openings 35 and thus promote air circulation therethrough.

At the radially inner portions of the openings 41, the reinforcing flanges 42 are extended generally axially inwardly to provide cover retaining fingers 43 having short and stiff generally radially inwardly and axially outwardly directed oblique terminals 44 which are engageable in retaining gripping relation with the radially outwardly facing surface of a generally axially extending flange portion 45 disposed at the radially outer side of a central portion of the wheel body 33 adjacent to the wheel openings 35.

It will be appreciated that the retaining terminals 44 normally extend to a diameter smaller than the diameter of the outer face of the wheel body flange 45 so that as the cover is pressed inwardly onto the wheel, the fingers 43 will be flexed generally radially outwardly and thus substantially resiliently tensioned, as backed up by the flange 42 in each instance and a juncture rib 47 where the fingers 43 join the wheel cover body 37. In the final assembly, the wheel cover engages against the wheel body at 48, namely adjacent to juncture of the wheel flange 45 with the axially outwardly projecting portion of the wheel body. Thereby, the radially outer portion 39 of the cover is held in spaced relation to the tire rim which it substantially covers and therefore, in addition to escape permitted for dirt through the openings 41, as well as air circulation, a gap between the cover and the tire rim is afforded for air circulation and the escape of dirt or gravel.

Removal of the cover 32 from the wheel may be effected by applying a pry-off tool such as a screwdriver or the like behind the outer margin of the cover and levering the pry-off tool against the tire rim to thereby apply axially outward pry-off force to the outer margin of the cover and thus effect sliding dislodgment of the finger terminals 44 from the wheel flange portion 45.

It will be understood that modifications and variations may be effected without departing from the scope of the novel concepts of the present invention.

I claim as my invention:

1. In a wheel structure including a wheel body supporting a tire rim and having air circulation openings at juncture with the rim, the wheel body having a generally radially facing annular and generally axially extending flange portion spaced radially inwardly from the wheel openings, a cover for disposition over the outer side of the wheel including an intermediate generally dished portion for overlying juncture of the wheel body and tire rim and having an annular series of generally radially extending openings therethrough overlying the wheel openings in air circulation relation and defined at their radially inner ends by axially inwardly extending retaining fingers derived from material struck from the openings, said fingers joining the cover on reinforcing shoulders and having at their axially inner ends cover retaining terminals engageable in resilient press-on, pry-off relation retainingly with the wheel body flange portion.

2. A wheel structure as defined in claim 1 wherein the openings are defined by axially inwardly extending reinforcing flanges and the retaining fingers comprise extensions of said flanges.

3. In a wheel structure including a wheel body and a tire rim supported thereby and having openings for air circulation at juncture of the wheel body with the tire rim, the wheel body having thereon spaced radially inwardly adjacent to the wheel openings a generally radially outwardly facing and axially extending annular shoulder flange portion, a cover for disposition over the outer side of the wheel including a circular cover portion for overlying the juncture between the wheel body and the tire rim and having openings through said portion with material struck from the openings formed into generally axially inwardly extending cover retaining fingers, and said retaining fingers having terminals that project generally radially inwardly into engagement with said wheel body shoulder flange.

4. In a wheel structure including a wheel body and a tire rim supported thereby and having openings for air circulation at juncture of the wheel body with the tire rim, the wheel body having thereon spaced radially inwardly but adjacent to the wheel openings a generally radially facing and axially extending annular shoulder flange portion, a cover for disposition over the outer side of the wheel including a circular cover portion for overlying the wheel body and the tire rim and having openings therethrough separated by generally radially extending spoke portions, material struck from the openings being formed into generally axially inwardly extending cover retaining fingers retainingly engaging in press-on, pry-off relation with said wheel body shoulder flange portion, said spokes and cover openings overlying the wheel body adjacent to said wheel openings as well as overlying the wheel openings and the adjacent part of the tire rim whereby to facilitate air circulation through the wheel openings and the cover openings.

5. A wheel structure as defined in claim 11 wherein said wheel shoulder flange portion is provided on the radially inner side of an annular axially outwardly projecting narrow nose bulge which is located immediately contiguous the wheel openings, the retaining fingers having terminals thereon that project generally radially outwardly for engagement with said wheel shoulder flange portion, said spokes overlying the nose bulge.

6. In a wheel structure including a tire rim and a wheel body supporting the same, the wheel body being provided adjacent juncture with the tire rim with a generally axially extending and radially outwardly facing shoulder flange, a cover member for disposition over the outer side of the wheel and having thereon a plurality of circumferentially spaced generally axially inwardly extending resilient retaining fingers radially resiliently flexible and having terminals thereon projecting generally radially inwardly normally to a smaller diameter than said body shoulder flange and engaging in retaining gripping relation with said shoulder flange under radially outwardly deflected resilient tensioning of the retaining fingers.

References Cited in the file of this patent

UNITED STATES PATENTS

| | | |
|---|---|---|
| 2,231,931 | Lyon | Feb. 18, 1941 |
| 2,264,946 | Lyon | Dec. 2, 1941 |
| 2,279,333 | Lyon | Apr. 14, 1942 |
| 2,293,007 | Lyon | Aug. 11, 1942 |
| 2,551,327 | Horn | May 1, 1951 |
| 2,600,410 | Lyon | June 17, 1952 |
| 2,760,829 | Lyon | Aug. 28, 1956 |
| 2,794,684 | Lyon | June 4, 1957 |
| 2,847,256 | Lyon | Aug. 12, 1958 |
| 2,885,038 | Lyon | May 5, 1959 |